United States Patent
Clemons et al.

(10) Patent No.: US 10,881,113 B2
(45) Date of Patent: Jan. 5, 2021

(54) AUTOMATED PAN SHAKER WITH MULTIPLE MODES OF MOVEMENT

(71) Applicant: Burford Corporation, Maysville, OK (US)

(72) Inventors: Scott Clemons, Blanchard, OK (US); Jerry Pack, Purcell, OK (US)

(73) Assignee: Burford Corporation, Maysville, OK (US)

( * ) Notice: Subject to any disclaimer, the term of this patent is extended or adjusted under 35 U.S.C. 154(b) by 62 days.

(21) Appl. No.: 15/720,338

(22) Filed: Sep. 29, 2017

(65) Prior Publication Data

US 2018/0092368 A1    Apr. 5, 2018

Related U.S. Application Data

(60) Provisional application No. 62/402,832, filed on Sep. 30, 2016.

(51) Int. Cl.
| | |
|---|---|
| *A21C 9/08* | (2006.01) |
| *A21C 7/00* | (2006.01) |
| *B01F 11/00* | (2006.01) |
| *A21C 13/02* | (2006.01) |

(52) U.S. Cl.
CPC ............. *A21C 9/085* (2013.01); *A21C 7/00* (2013.01); *A21C 9/083* (2013.01); *B01F 11/0014* (2013.01); *B01F 11/0022* (2013.01); *B01F 11/0097* (2013.01); *A21C 13/02* (2013.01)

(58) Field of Classification Search
CPC ........... A21C 9/085; A21C 9/083; A21C 7/00; A21C 13/02; B01F 11/00–11/0097
USPC .......................................... 366/108–116, 128
See application file for complete search history.

(56) References Cited

U.S. PATENT DOCUMENTS

| | | | |
|---|---|---|---|
| 2,255,799 A | 9/1941 | Meinzer | |
| 2,826,081 A * | 3/1958 | Campbell | B28B 1/087 74/61 |
| 3,489,393 A * | 1/1970 | Waraksa | B01F 11/0042 366/162.2 |
| 4,561,346 A | 12/1985 | Marquer | |
| 4,673,297 A | 6/1987 | Siczek et al. | |
| 4,841,848 A * | 6/1989 | Baker | C12G 1/062 366/128 |
| 5,499,872 A | 3/1996 | Baxter | |

(Continued)

OTHER PUBLICATIONS

Application No. PCT/US2017/054372, International Search Report, dated Dec. 15, 2017.

(Continued)

*Primary Examiner* — Charles Cooley
(74) *Attorney, Agent, or Firm* — Crowe & Dunlevy (57) ABSTRACT

An automated pan shaker has a central longitudinal axis and a central lateral axis. The automated pan shaker includes a shaker assembly that has a carriage assembly, a clamping assembly supported by the carriage assembly and an actuation assembly. The actuation assembly further includes an actuator post connected to the carriage assembly, a first actuator assembly that includes a first actuator linkage connected to the actuator post, and a second actuator assembly that includes a second actuator linkage connected to the actuator post. Also disclosed is a method for inducing orbital movement in a bakery pan using a plurality of offset actuation assemblies.

19 Claims, 9 Drawing Sheets

(56) References Cited

U.S. PATENT DOCUMENTS

| | | | |
|---|---|---|---|
| 5,839,770 A | 11/1998 | Zajac, Jr. et al. | |
| 6,322,243 B1* | 11/2001 | Bull .................... | B01F 11/0025 366/208 |
| 7,188,994 B2* | 3/2007 | Poo ......................... | B01F 9/002 366/187 |
| 2004/0022120 A1* | 2/2004 | Poo ......................... | B01F 9/002 366/200 |
| 2010/0227038 A1 | 9/2010 | Carroll, Jr. | |
| 2018/0092368 A1* | 4/2018 | Clemons ................ | A21C 9/085 |

OTHER PUBLICATIONS

PCT/US20/23509; International Search Report and Written Opinion dated Jun. 8, 2020.

* cited by examiner

AUTOMATED PAN SHAKER WITH MULTIPLE MODES OF MOVEMENT

RELATED APPLICATIONS

This application claims the benefit of U.S. Provisional Patent Application No. 62/402,832, filed Sep. 30, 2016, entitled "Automated Pan Shaker with Multiple Modes of Movement," the disclosure of which is herein incorporated by reference.

FIELD OF THE INVENTION

The present invention generally relates to equipment used in the baking industry and more particularly, but not by way of limitation, to equipment configured to shake pans filled with dough.

BACKGROUND OF THE INVENTION

For many years, commercial bakeries have utilized assembly-line production to prepare and bake products. In many cases, baked goods are prepared by placing pans onto a conveyor system, loading dough into the pans and moving the pans and dough through preparation, cooking and packaging processes. Commercial baking pans often include multiple rows of molds used to hold the dough. Because the dough is deposited into these molds with automated equipment, there is a chance that some pieces of dough will deposited entirely or partially outside the designated mold within the pan.

Pan shakers are used to center dough within each mold to ensure that the products within each pan are uniform. In the past, pan shakers have used a magnetic base that temporarily attaches to the bottom of the pan, lifts the pan off the conveyor system and executes an orbital movement to shake the pan. The orbital movement provides a positive dough placement within the molds of the pan. Once the orbital movement has been completed, the magnetic base returns the pan to the conveyor system and releases the pan.

Although generally effective, prior art pan shakers may be inadequate in certain applications. In particular, prior art pan shakers are configured to produce a single orbital movement. Depending on the arrangement and configuration of molds on the pan, the orbital movement may prove ineffective at centering the dough within the molds. Accordingly, conventional pan shakers may not be well-suited to perform shaking operations on a variety of baking pans. Additionally, as baking pans have increased in size, the magnetic base used to capture and shake the pan may be insufficient. It is to this and other deficiencies in the prior art that the preferred embodiments are directed.

SUMMARY OF THE INVENTION

In one aspect, the present invention includes an automated pan shaker having a central longitudinal axis and a central lateral axis. The automated pan shaker includes a shaker assembly that has a carriage assembly, a clamping assembly supported by the carriage assembly and an actuation assembly. The actuation assembly further includes an actuator post connected to the carriage assembly, a first actuator assembly that includes a first actuator linkage connected to the actuator post, and a second actuator assembly that includes a second actuator linkage connected to the actuator post.

In another aspect, the present invention includes an automated pan shaker having a length that extends in a longitudinal direction and a width that extends in a lateral direction. The automated pan shaker includes a stationary frame assembly and a shaker assembly. The shaker assembly includes a carriage assembly and an actuation assembly supported by the frame assembly and configured to move the carriage assembly. The actuation assembly has an actuator post, a first actuator assembly and a second actuator assembly. The first actuator assembly includes a first actuator linkage extending to the actuator post in a direction that is predominately longitudinal. The second actuator assembly includes a second actuator linkage extending to the actuator post in a direction that is predominately lateral.

In yet another aspect, the present invention includes a method for inducing a selected orbital movement in a bakery pan with an automated pan shaker. The method includes the steps of providing a carriage assembly that is configured for lateral and longitudinal movement within the automated pan shaker, providing a clamping assembly carried by the carriage assembly, and providing an actuation assembly that has a first actuator assembly and a second actuator assembly. Each of the first and second actuator assemblies have a motor that rotates a motor shaft, an eccentric cam connected to the motor shaft, and a linkage connected to the eccentric cam and a common actuator post. The method also includes the steps of closing the clamping mechanism on the bakery pan, positioning the motor shaft of the first actuator assembly in a starting rotational position and positioning the motor shaft of the second actuator assembly in a starting rotational position. The method then includes the step of rotating the motor shaft of the first actuator assembly according to a first rotational profile and rotating the motor shaft of the second actuator assembly according to a second rotational profile.

WRITTEN DESCRIPTION

Referring first to FIGS. 1-4, shown therein are various views of a pan shaker 100 constructed in accordance with presently preferred embodiments. The pan shaker 100 is well-suited for use in a commercial bakery that employs automated assembly-line production processes. The pan shaker 100 is generally configured to perform a shaking operation on a series of pans 200 that are fed to the pan shaker 100 on an assembly line (not shown). Each of the pans 200 includes a series of pan molds 202 that are sized and shaped to hold the dough for a specific baked good (e.g., hamburger buns, bread loafs, etc.). The shaking operation helps to center the dough within each of the pan molds 202 to encourage the production of substantially uniform baked goods.

The pan shaker 100 includes several major assemblies, including a frame assembly 102, a conveyor assembly 104, a control assembly 106 and a shaker assembly 108. The frame assembly 102 includes a series of legs 110, structural cross-members 112 and guards 114 that support and protect the other components within the pan shaker 100. The frame assembly 102 also includes a pair of frame rails 116 and motor mounts 118 that support components within the shaker assembly 108. The conveyor assembly 104 includes a conveyor belt 120 and conveyor belt motor 122 that carries the pan 200 through the pan shaker 100. As used in this disclosure, the term "longitudinal" will refer to an axis followed by the pan 200 as it passes through the pan shaker 100. The term "lateral" will refer to an axis that is transverse to the longitudinal axis. The lateral axis extends across the width of the pan shaker 100.

The control assembly 106 includes operator controls, power supplies, warning systems, and control controls systems (not separately designated). The control assembly 106 receives input from various sensors located within the pan shaker 100 and controls the operation of the shaker assembly 108 and conveyor assembly 104. In certain applications, the control assembly 106 is configured to receive input from upstream components within the bakery. For example, the control assembly 106 can be configured to proactively adapt the operation of the shaker assembly 108 and conveyor assembly 104 in anticipation of a change in the size, speed or configuration of the pans 200 approaching the pan shaker 100.

Figure 1:
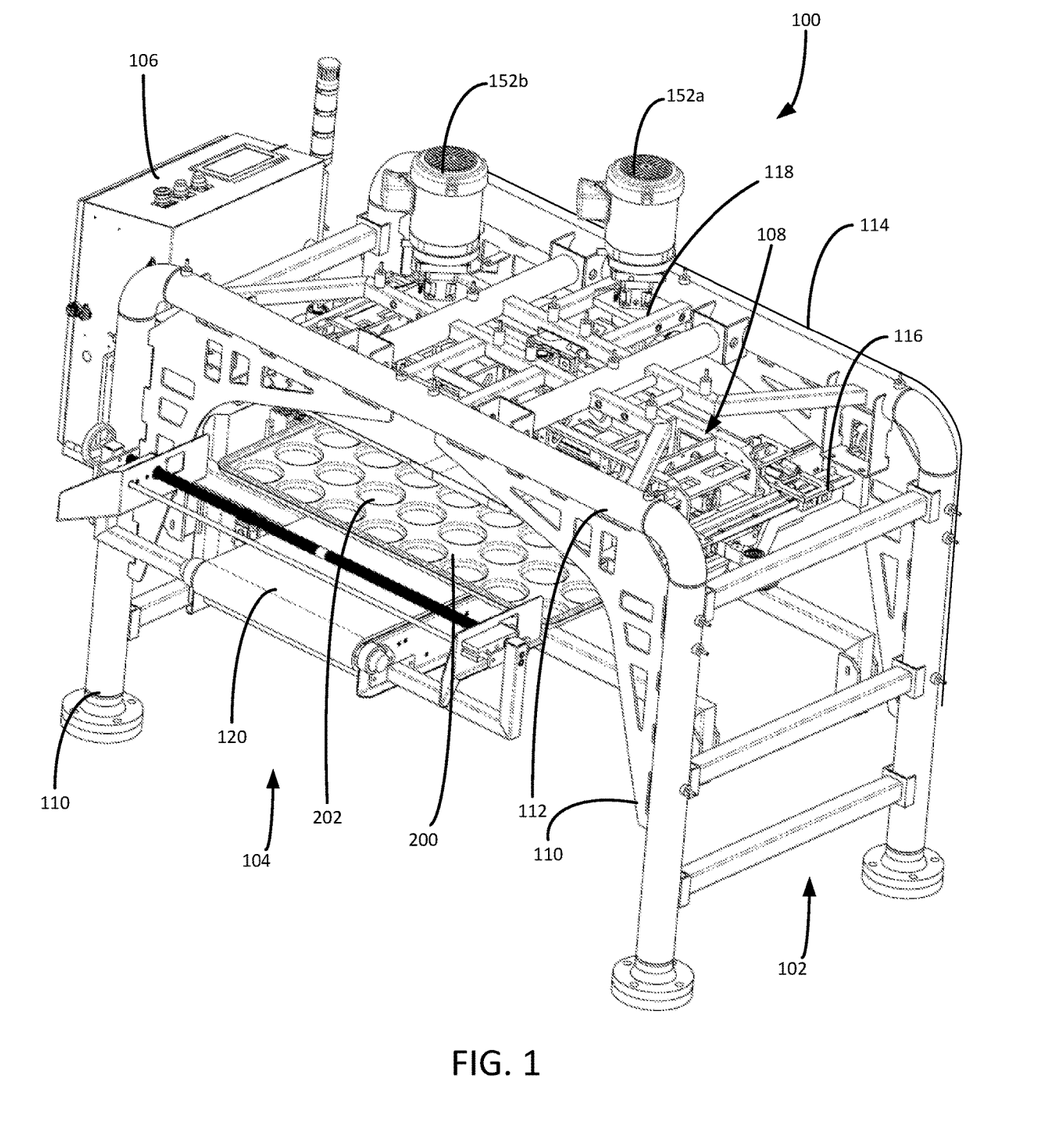
FIG. 1 is a perspective view of a pan shaker constructed in accordance with a presently preferred embodiment.
Figure 2:
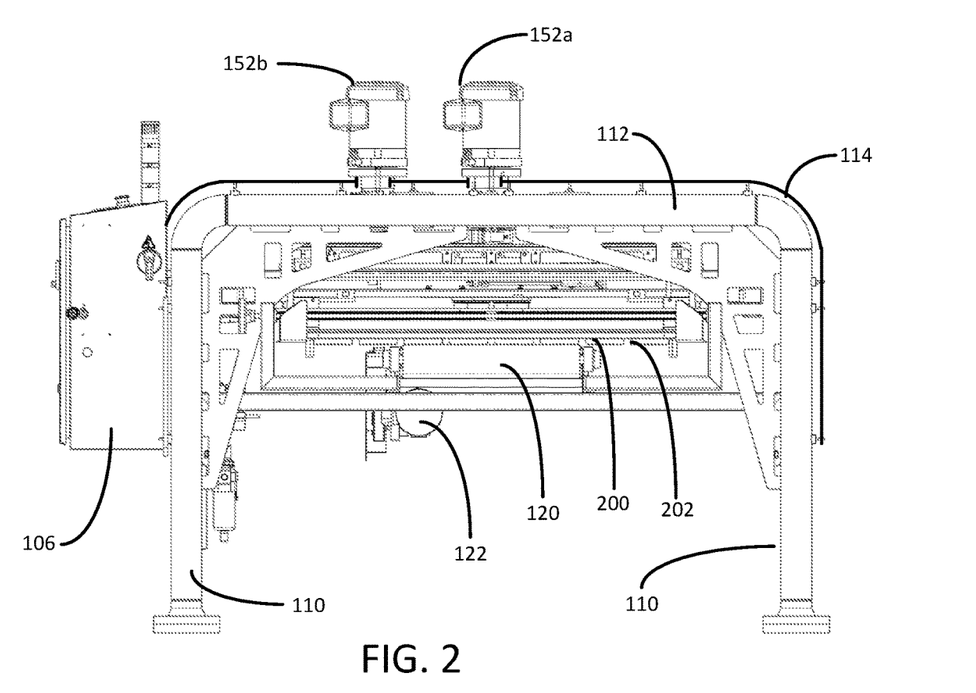
FIG. 2 is an upstream view of the pan shaker.
Figure 3:
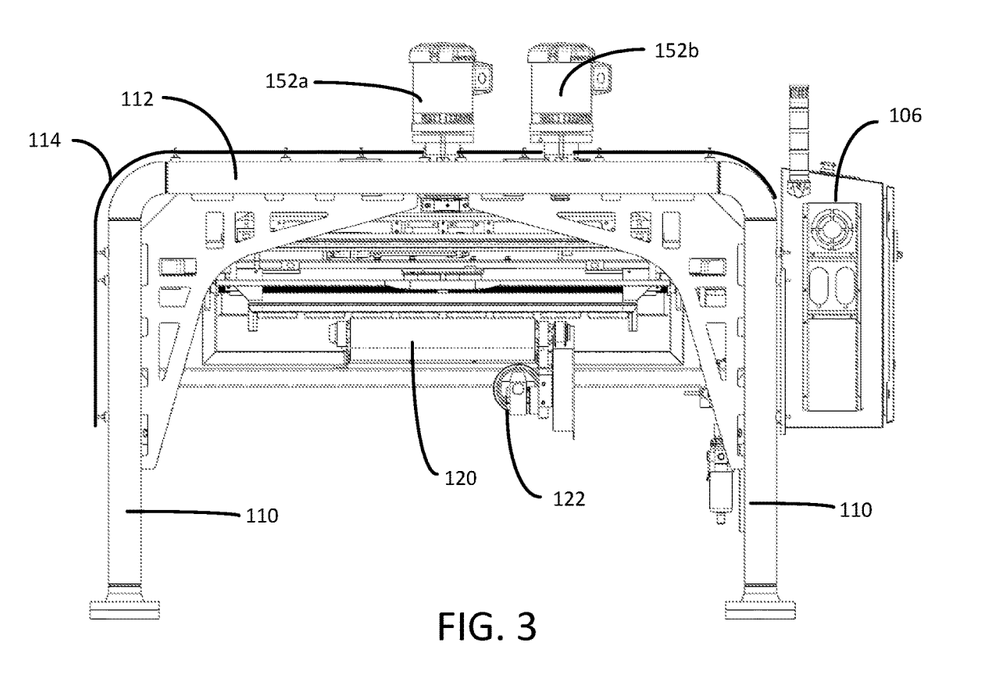
FIG. 3 is a downstream view of the pan shaker.
Figure 4:
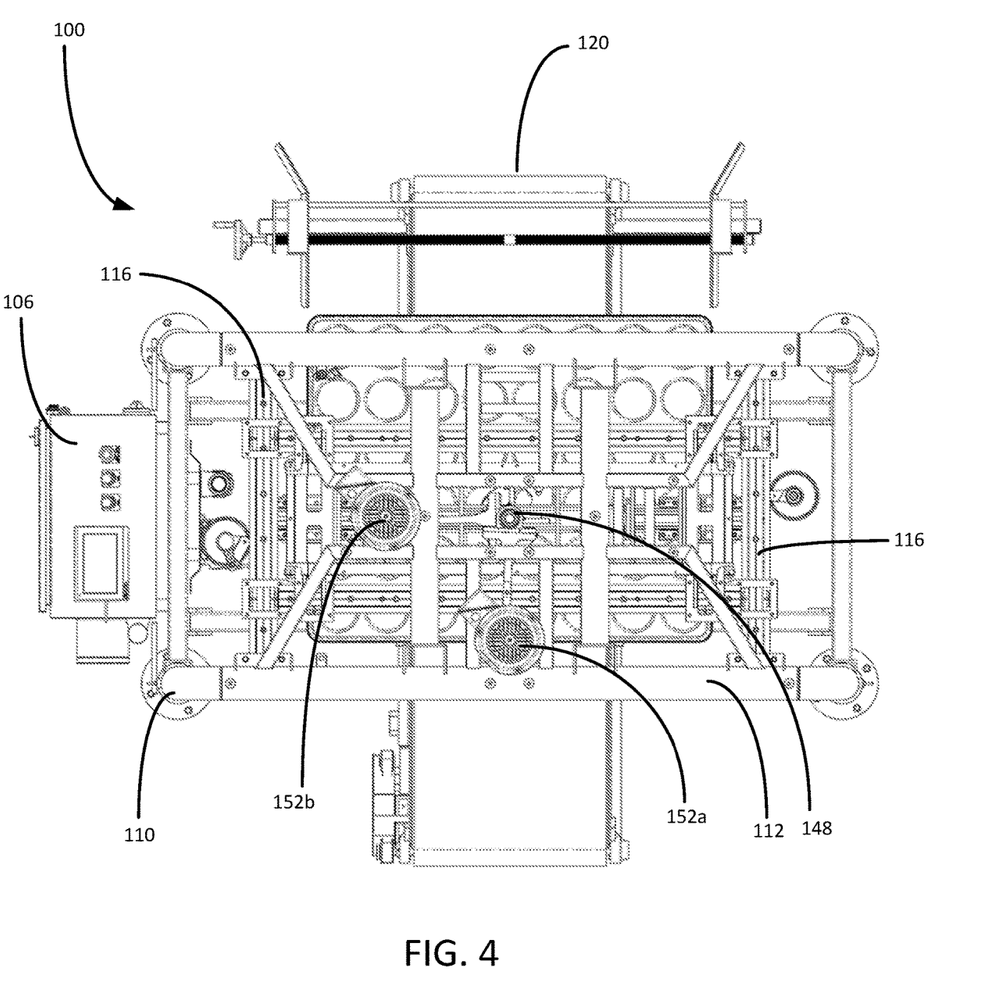
FIG. 4 is a top view of the pan shaker.
Figure 5:
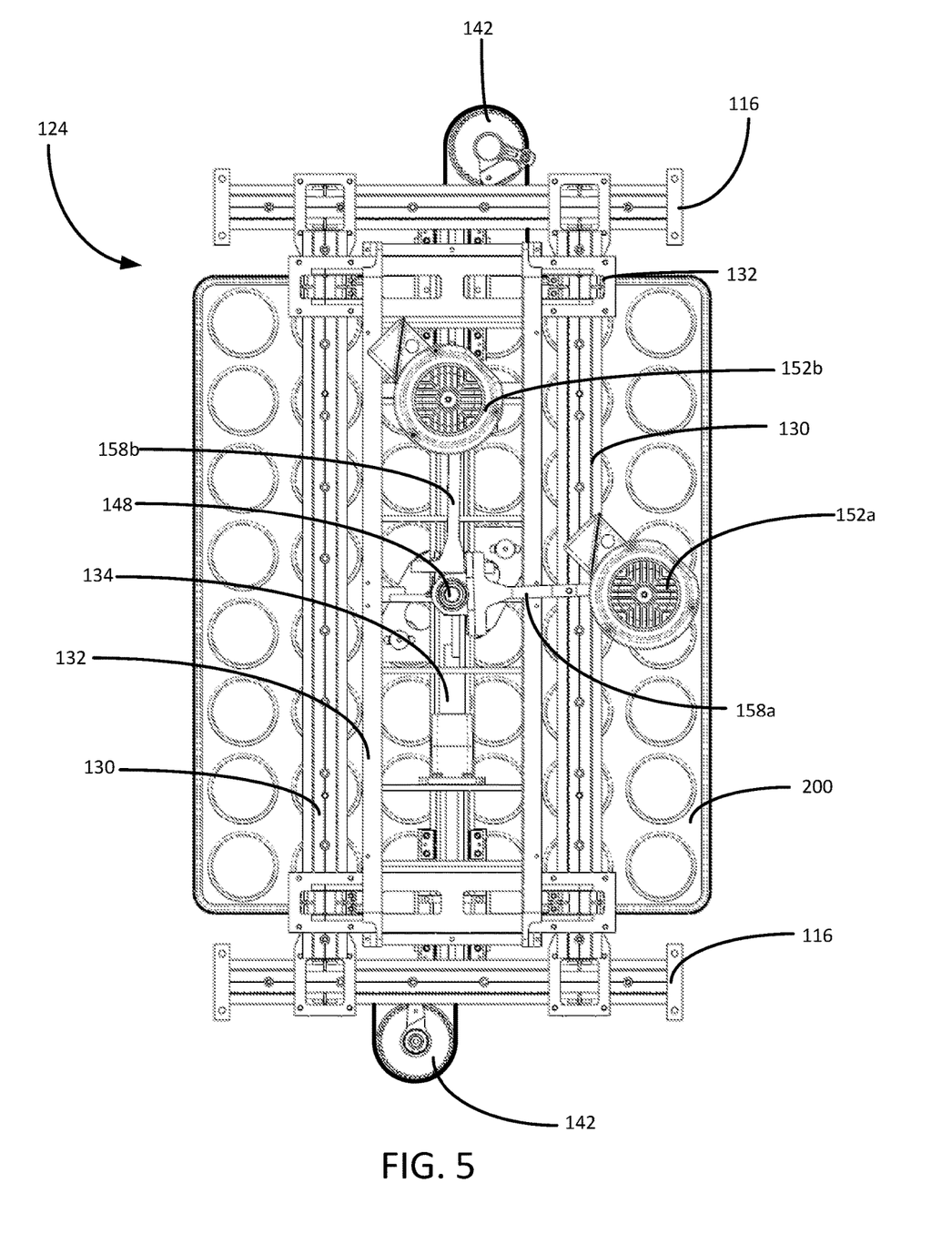
FIG. 5 is a top view of the shaker assembly of the pan shaker.
Figure 6:
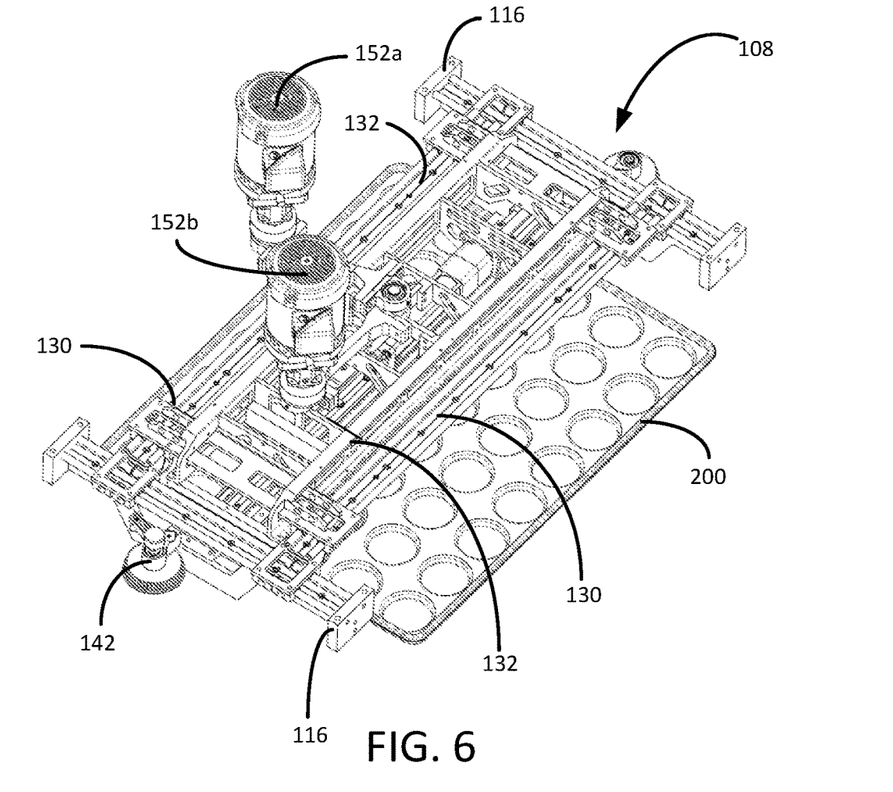
FIG. 6 is a perspective view of the shaker assembly.
Figure 7:
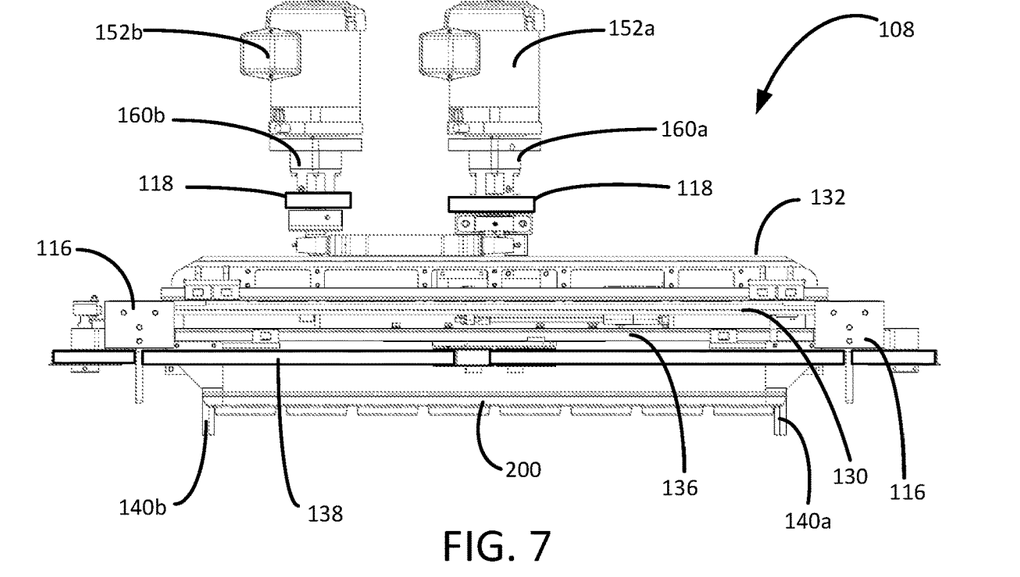
FIG. 7 is an upstream view of the shaker assembly.
Figure 8:
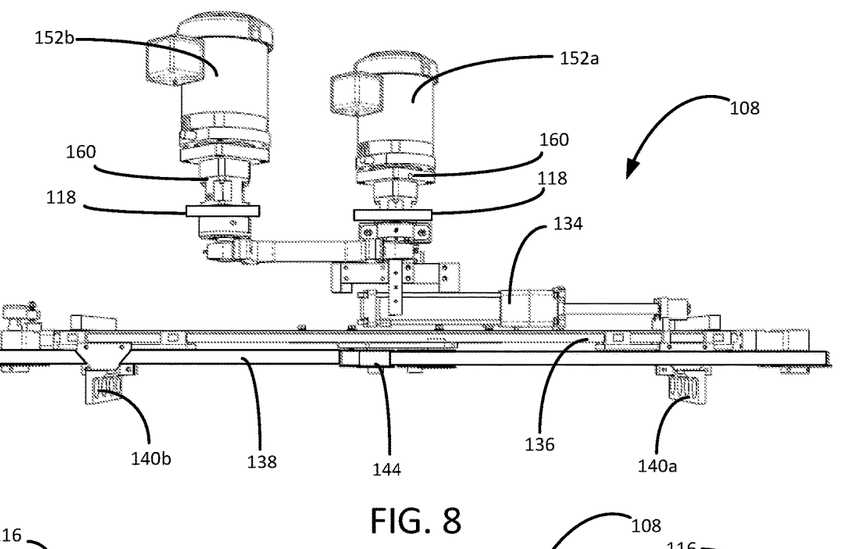
FIG. 8 is an upstream view of the clamping assembly of the shaker assembly.

Turning to FIGS. 5-7, shown therein are various views of the shaker assembly 108. The shaker assembly 108 includes a carriage assembly 124, a clamping assembly 126 and actuation assembly 128. The carriage assembly 124 includes a pair of lateral rails 130 that ride on a low-friction bearing connection to frame rails 116. The lateral rails 130 permit the carriage assembly 124 to move back and forth along the longitudinal axis of the pan shaker 100. The carriage assembly 124 further includes a central support 132 that rides on the lateral rails 130. The central support 132 is thus configured to move back and forth laterally on the lateral rails 130, which in turn are permitted to reciprocate back and forth longitudinally along the frame rails 116.

Figure 9:
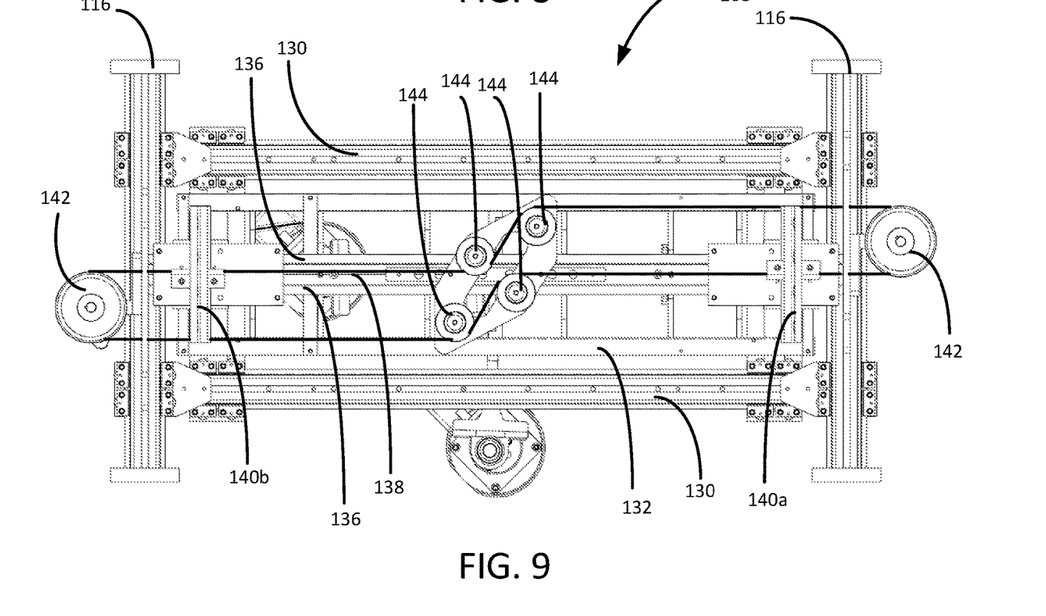
FIG. 9 is a bottom view of the shaker assembly.
Figure 10:
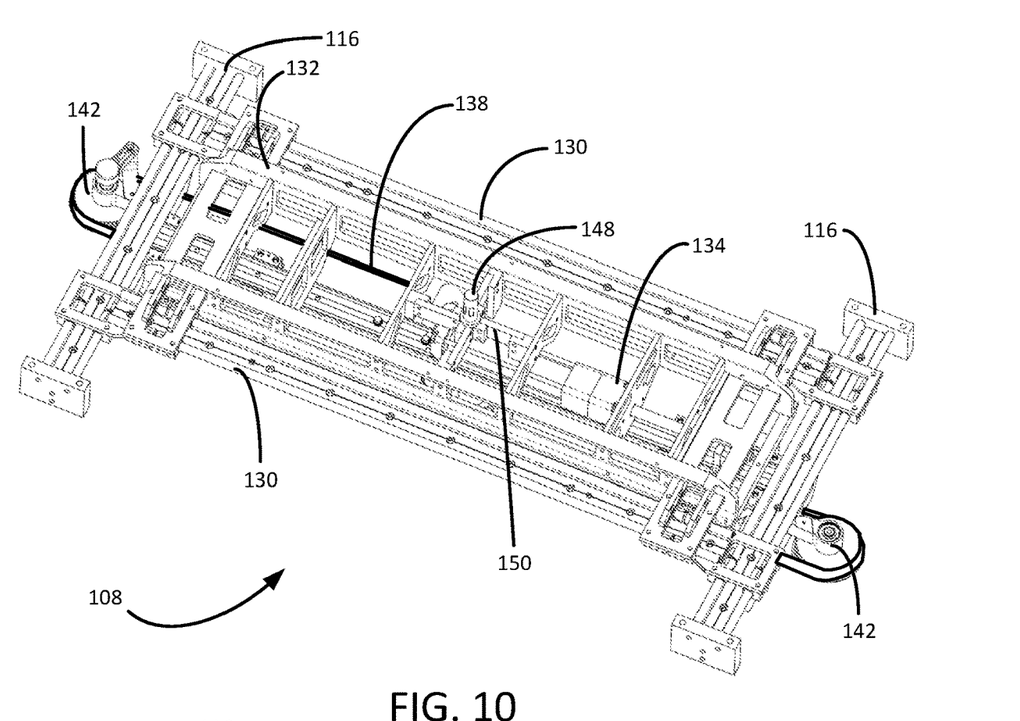
FIG. 10 is a top perspective view of the shaker assembly.
Figure 11:
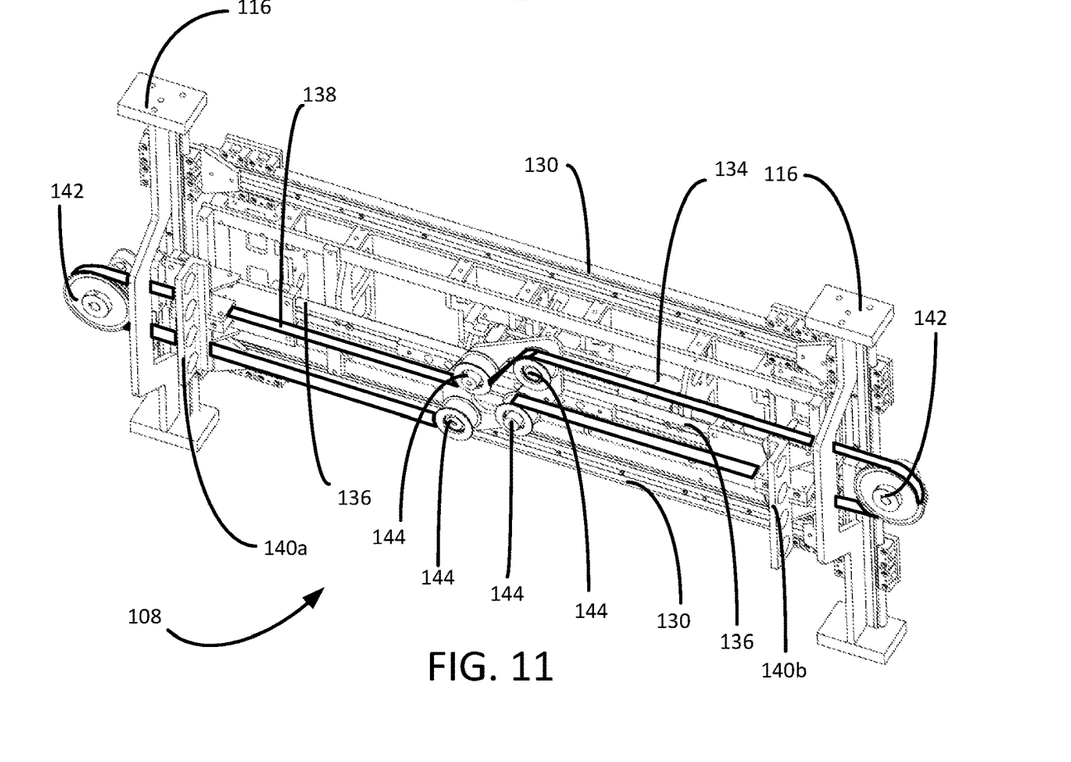
FIG. 11 is a bottom perspective view of the clamping assembly.

With continued reference to FIGS. 5-7 but with reference also to FIGS. 8-11, it will be noted that the clamping assembly 126 hangs from the central support 132. The clamping assembly 126 includes a dual-acting pneumatic cylinder 134, clamp rails 136, a drive belt 138, clamps 140a, 140b, exterior pulleys 142 and interior pulleys 144. In the presently preferred embodiment, the clamps 140a, 140b ride on the pair of clamp rails 136. Each clamp 140a, 140b is secured to the drive belt 138. As best seen in FIGS. 9 and 11, the interior pulleys 144 and exterior pulleys 142 are spaced and configured to route the drive belt 138 across the width of the shaker assembly 108 such that opposite sides of the drive belt 138 are placed in a linear relationship through the center of the central support 132. Each clamp 140a, 140b is thereby centered under the central support 132 and attached to the drive belt 138 on opposite sides of the exterior pulleys 142.

The first clamp 140a is also attached to the pneumatic cylinder 134 and the first clamp 140a moves back and forth on the clamp rails 136 in response to the bidirectional actuation of the pneumatic cylinder 134. As the first clamp 140a moves, it pulls the drive belt 138. The drive belt 138 causes the second clamp 140b to move on the clamp rails 136 in an opposite direction from the first clamp 140a. In this way, the two clamps 140a, 140b are drawn together or pulled apart in unison in response to the controlled and automated actuation of the pneumatic cylinder 134. Encoders on the exterior pulleys 142 provide the control assembly 106 with real-time information about the position of the drive belt 138 and clamps 140a, 140b.

During use, the clamps 140a, 140b are rapidly drawn together to secure the pan 200. Once the shaking operation is complete, the clamps 140a, 140b are separated to release the pan 200. The clamping assembly 126 presents a significant advantage over prior art magnetic clamping systems. The clamping assembly 126 can be used for heavier pans 200 and pans 200 that are not constructed from ferromagnetic materials. The clamping assembly 126 can also adapt automatically and in real-time for use with pans 200 of various shapes, sizes and orientation. These features allow the pan shaker 100 to be used for a variety of pans and bakery products without extensive and time-consuming reconfiguration.

Figure 12:
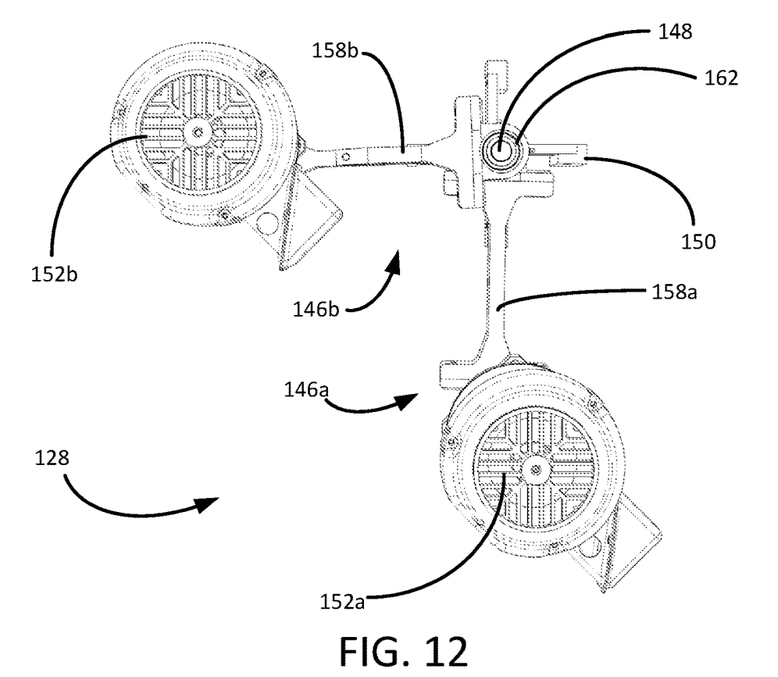
FIG. 12 is a top view of the actuation assembly.
Figure 13:
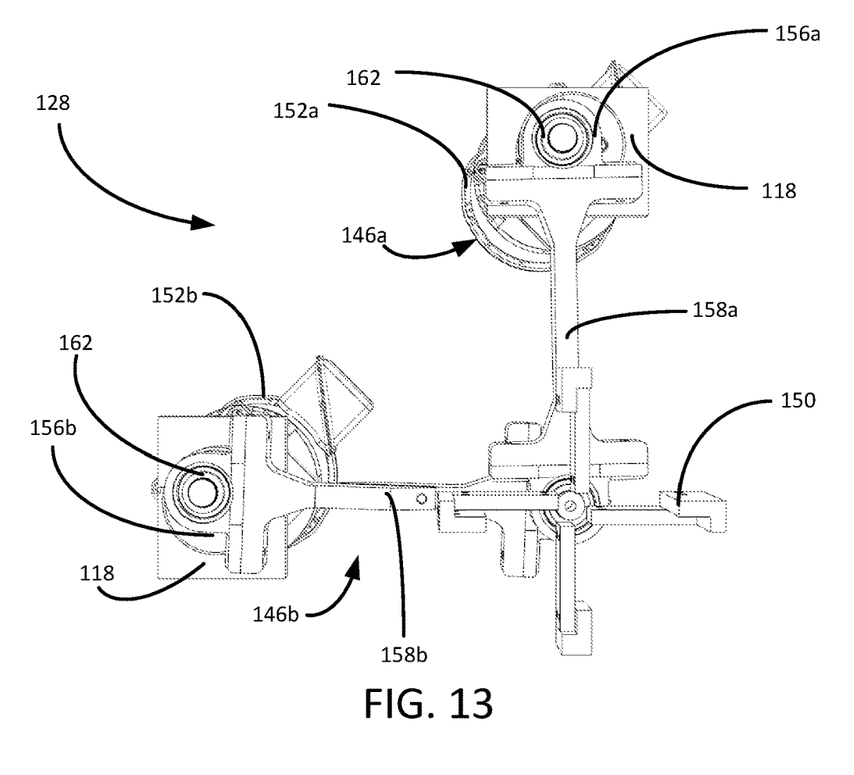
FIG. 13 is a bottom view of the actuation assembly.
Figure 14:
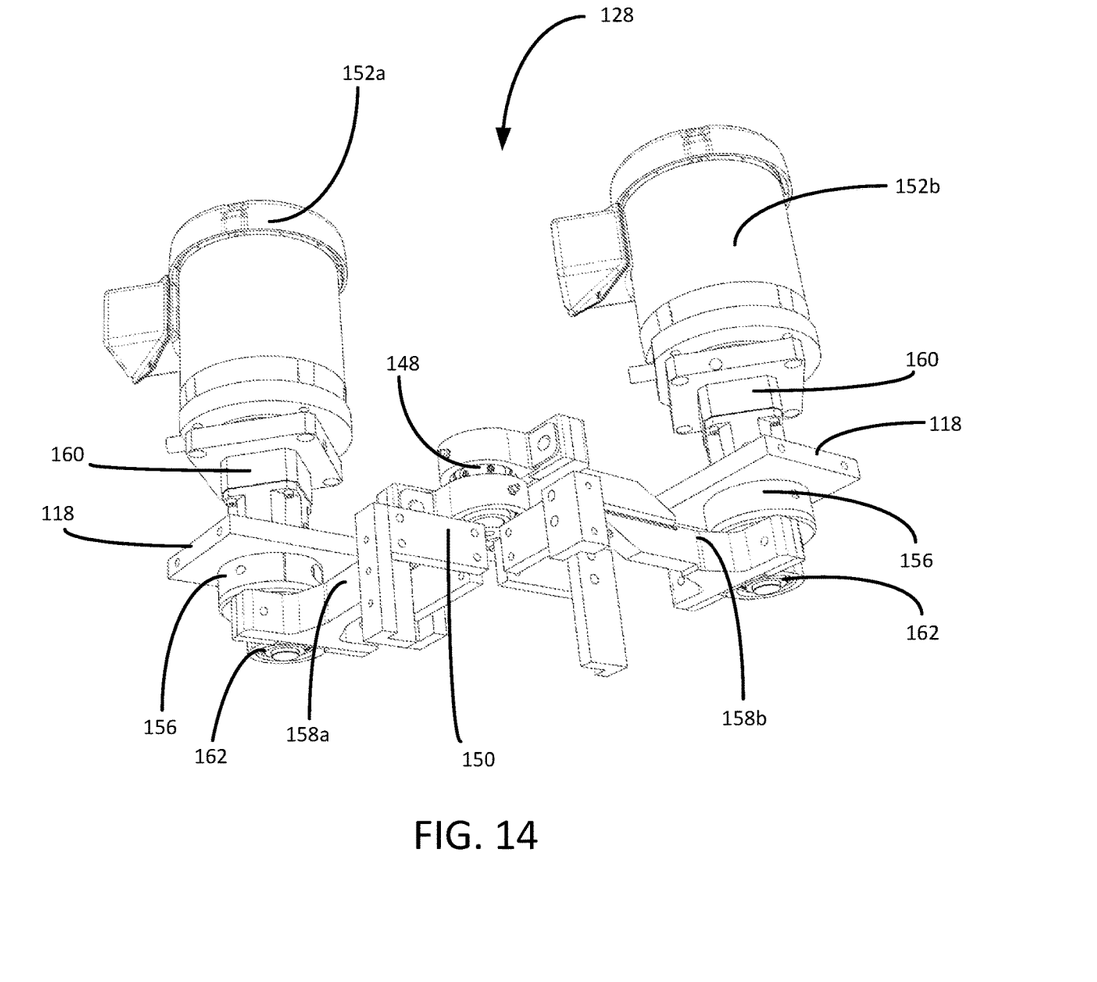
FIG. 14 is a perspective view of the actuation assembly.

Turning to FIGS. 12-14, shown therein a various views of the actuation assembly 128. The actuation assembly 128 generally includes a first actuator assembly 146a, a second actuator assembly 146b, an actuator post 148 and an actuator brace 150. Each of the first actuator assembly 146a and second actuator assembly 146b includes an electric motor 152 that drives a rotating shaft 154, which in turn drives an eccentric cam 156. The first and second actuator assemblies 146a, 146b each includes a linkage 158 that is connected to the corresponding eccentric cam 156 on one end and to the actuator post 148 on the other end. On each end, the linkage 158 includes a bearing 162 that permits the eccentric cam 156 and actuator post 148 to rotate within the linkage 158. The rotation of each eccentric cam 156 therefore induces a reciprocating linear-orbital movement in the corresponding linkage 158. This linear-orbital movement is conveyed through the linkages 158 to the actuator post 148.

Because the first and second actuator assemblies 146a, 146b are positioned in an offset relationship, the actuator post 148 is moved in different directions by the two linkages 158a, 158b. As best seen in the top views of FIGS. 4-5, the first actuator assembly 146a is positioned substantially along the central longitudinal axis of the pan shaker 100 and configured with respect to the actuator post 148 to induce a primarily longitudinal motion. The second actuator assembly 146b is positioned substantially along the central lateral axis of the pan shaker 100 and configured with respect to the actuator post 148 to induce a primarily lateral motion. The actuator brace 150 transfers the combined, composite movement of the actuator post 148 to the central support 132 of the shaker assembly 108, which in turn moves the clamping assembly 126 and pan 200.

Rotational encoders 160 are used to detect the rotational position and speed of each motor 152a, 152b. In response to input from the rotational encoders 158 and the operational profile selected by the operator or automatically by the control assembly 106, the control assembly 106 energizes each motor 152a, 152b according to an independent motor control signal. By independently controlling the relative starting positions and rotational speeds of each motor 152a, 152b, the actuation assembly 128 can induce an infinite number of movement profiles in the clamping assembly 126.

For example, in a first mode of operation, the first actuator assembly 146a is controlled to induce a mode of movement in which the clamping assembly 126 reciprocates in a substantially linear path along the longitudinal axis of the pan shaker 100. Because of the geometry of the eccentric cam 156a and linkage 158, rotating only the motor 152a of the first actuator assembly 146a would induce some lateral movement in the actuator post 148. To cancel this lateral movement, the second actuator assembly 146b is positioned and slightly rotated back and forth to compensate for the unwanted lateral movement produced by the first actuator assembly 146a.

In a second mode of operation, the second actuator assembly 146b is used to induce a mode of movement in which the clamping assembly 126 reciprocates in a substantially linear path along the lateral axis of the pan shaker 100. To cancel any unwanted longitudinal movement in the pan 200, the first actuator assembly 146a is positioned and slightly rotated back and forth to compensate for the unwanted longitudinal movement produced by the second actuator assembly 146b.

In a third mode of operation, the first and second actuator assemblies 146a, 146b cooperate to produce an orbital motion in the clamping assembly 126. By coordinating the starting position and speed of each motor 152a, 152b, the shape of the orbital movement can be made predominately longitudinal, predominately lateral, or circular by precisely controlling the starting position and matching the rotational speed of the motors 152a, 152b.

Complex movement profiles can be created by setting the motors 152a, 152b at different rotational speeds or varying the rotational speeds of the motors 152a, 152b during a shaking operation. Additionally, the actuation assembly 128 can be configured to switch between movement profiles within a single shaking operation. For example, it may be desirable to first shake the pan 200 along a longitudinal axis before shaking the pan 200 in a lateral direction. An additional benefit of the novel actuation assembly 128 is the ability to rapidly land the pan 200 within the center of the conveyor assembly 104. Based on feedback from the rotational encoders 160, the control system can stop the motors 152a, 152b in a position that places the pan 200 in the center of the conveyor belt 120.

Thus, as described herein, the pan shaker 100 overcomes a number of deficiencies in the prior art and provides a mechanism that can be easily and automatically adapted to carry out a customized shake movements on pans of varying shapes, sizes and configurations. It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms expressed herein and within the appended claims. It will be appreciated by those skilled in the art that the teachings of the present invention can be applied to other systems without departing from the scope and spirit of the present invention.

It is claimed:

1. An automated pan shaker having a central longitudinal axis and a central lateral axis, the automated pan shaker comprising:
   a shaker assembly, wherein the shaker assembly comprises:
     a carriage assembly;
     a clamping assembly supported by the carriage assembly; and
     an actuation assembly, wherein the actuation assembly further comprises:
       an actuator post connected to the carriage assembly;
       a first actuator assembly that includes a first actuator linkage connected to the actuator post;
       a second actuator assembly that includes a second actuator linkage connected to the actuator post; and
       wherein the first actuator linkage is substantially aligned with the central longitudinal axis, and wherein the second actuator linkage is substantially aligned with the central lateral axis.

2. The automated pan shaker of claim 1, wherein the first actuator linkage and the second actuator linkage are not linearly aligned.

3. The automated pan shaker of claim 1, wherein the first actuator assembly further comprises a motor having a rotatable shaft and an eccentric cam connected to the rotatable shaft and the first actuator linkage, and wherein the second actuator assembly further comprises a motor having a rotatable shaft and an eccentric cam connected to the rotatable shaft and the second actuator linkage.

4. The automated pan shaker of claim 1, further comprising a frame assembly that includes a pair of spaced apart frame rails that extend in a direction that is substantially parallel to the central longitudinal axis.

5. The automated pan shaker of claim 4, wherein the carriage assembly further comprises:
   a pair of spaced apart lateral rails that extend in a direction that is substantially parallel to the central lateral axis, wherein each of the lateral rails rides on the frame rails; and
   a central support that rides on the lateral rails, wherein the clamping assembly hangs from the central support.

6. The automated pan shaker of claim 5, wherein the actuation assembly further comprises an actuator brace and wherein the actuator post is connected to the central support with the actuator brace.

7. The automated pan shaker of claim 1, further comprising a conveyor assembly, wherein the conveyor assembly is configured to convey a bakery pan through the automated pan shaker in a direction substantially parallel to the central longitudinal axis.

8. The automated pan shaker of claim 7, wherein the clamping assembly comprises:
   a clamp rail supported by the carriage assembly; and
   a pair of clamps that ride on the clamp rail, wherein the pair of clamps are configured to releasably grasp the bakery pan.

9. The automated pan shaker of claim 8, wherein the clamping assembly further comprises:
   a pneumatic cylinder, wherein the pneumatic cylinder is connected to a first of the pair of clamps; and
   a drive belt connected to the second of the pair of clamps, wherein the movement of the first of the pair of clamps by the pneumatic cylinder causes the second of the pair of clamps to move in an opposite direction to the first of the pair of clamps.

10. An automated pan shaker having a length that extends in a longitudinal direction and a width that extends in a lateral direction, the automated pan shaker comprising:
    a stationary frame assembly;
    a conveyor assembly, wherein the conveyor assembly is configured to convey a bakery pan through the automated pan shaker in the longitudinal direction; and
    a shaker assembly, wherein the shaker assembly comprises:

a carriage assembly; and an actuation assembly supported by the frame assembly and configured to move the carriage assembly, wherein the actuation assembly comprises:

an actuator post;

a first actuator assembly, wherein the first actuator assembly includes a first actuator linkage extending to the actuator post in a direction that is predominately longitudinal; and a second actuator assembly, wherein the second actuator assembly includes a second actuator linkage extending to the actuator post in a direction that is predominately lateral.

11. The automated pan shaker of claim 10, wherein the first actuator assembly further comprises a motor having a rotatable shaft and an eccentric cam connected to the rotatable shaft and the first actuator linkage.

12. The automated pan shaker of claim 11, wherein the frame assembly includes a pair of spaced apart frame rails that extend in the longitudinal direction.

13. The automated pan shaker of claim 12, wherein the carriage assembly further comprises:

a pair of spaced apart lateral rails that extend the lateral direction, wherein each of the lateral rails rides on the frame rails.

14. The automated pan shaker of claim 13, wherein the carriage assembly further comprises a pan clamping assembly that includes:

a pair of clamps;

a drive belt connected to the pair of clamps; and a bi-directional pneumatic cylinder that is connected to one of the pair of clamps.

15. An automated pan shaker having a central longitudinal axis and a central lateral axis, the automated pan shaker comprising:

a conveyor assembly, wherein the conveyor assembly is configured to convey a bakery pan through the automated pan shaker along the central longitudinal axis; and a shaker assembly, wherein the shaker assembly comprises:

a carriage assembly;

a clamping assembly supported by the carriage assembly; and an actuation assembly, wherein the actuation assembly further comprises:

an actuator post connected to the carriage assembly;

a first actuator assembly that includes a first actuator linkage connected to the actuator post; and a second actuator assembly that includes a second actuator linkage connected to the actuator post.

16. The automated pan shaker of claim 15, wherein the first actuator linkage and the second actuator linkage are not linearly aligned.

17. The automated pan shaker of claim 15, wherein the first actuator linkage is substantially aligned with the central longitudinal axis, and wherein the second actuator linkage is substantially aligned with the central lateral axis.

18. The automated pan shaker of claim 15, wherein the first actuator assembly further comprises a motor having a rotatable shaft and an eccentric cam connected to the rotatable shaft and the first actuator linkage, and wherein the second actuator assembly further comprises a motor having a rotatable shaft and an eccentric cam connected to the rotatable shaft and the second actuator linkage.

19. The automated pan shaker of claim 15, further comprising a frame assembly that includes a pair of spaced apart frame rails that extend in a direction that is substantially parallel to the central longitudinal axis.

* * * * *